(12) United States Patent
Shimizu et al.

(10) Patent No.: US 7,691,500 B2
(45) Date of Patent: Apr. 6, 2010

(54) PERPENDICULAR MAGNETIC RECORDING MEDIUM

(75) Inventors: Masayoshi Shimizu, Kanagawa (JP); Reiko Arai, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 2 days.

(21) Appl. No.: 11/998,731

(22) Filed: Nov. 30, 2007

(65) Prior Publication Data

US 2008/0130170 A1 Jun. 5, 2008

(30) Foreign Application Priority Data

Dec. 5, 2006 (JP) ............... 2006-328520

(51) Int. Cl.
*G11B 5/66* (2006.01)
(52) U.S. Cl. ............... 428/827; 428/828; 428/828.1; 428/829
(58) Field of Classification Search ............ None
See application file for complete search history.

(56) References Cited

U.S. PATENT DOCUMENTS

| | | | |
|---|---|---|---|
| 5,792,564 A | 8/1998 | Hikosaka et al. | |
| 6,872,478 B2 * | 3/2005 | Bian et al. | 428/831 |
| 6,881,503 B2 * | 4/2005 | Lu et al. | 428/828 |
| 7,153,596 B2 | 12/2006 | Tanahashi et al. | |
| 7,175,925 B2 * | 2/2007 | Chen et al. | 428/831 |
| 2004/0043258 A1 * | 3/2004 | Yamamoto et al. | 428/694 TM |
| 2005/0202286 A1 * | 9/2005 | Chen et al. | 428/831 |
| 2005/0244679 A1 * | 11/2005 | Arai et al. | 428/828 |

FOREIGN PATENT DOCUMENTS

| | | |
|---|---|---|
| JP | 63-074121 A | 4/1988 |
| JP | 01-267834 A | 10/1989 |
| JP | 06-103554 A | 4/1994 |
| JP | 2001-155321 A | 6/2001 |

\* cited by examiner

*Primary Examiner*—Kevin M. Bernatz
*Assistant Examiner*—Gary D. Harris
(74) *Attorney, Agent, or Firm*—Townsend and Townsend and Crew LLP; Darren Gold

(57) ABSTRACT

Embodiments of the present invention help to provide an excellent perpendicular recording medium of high medium signal-to-noise (S/N) and with suppressed blurring in writing. According to one embodiment, a perpendicular recording layer is provided by way of a negative magnetic strain soft-magnetic underlayer above a substrate applied with texturing in the circumferential direction. The soft-magnetic underlayer has a first soft magnetic layer, a second soft magnetic layer and a nonmagnetic magnetic layer formed between the first soft magnetic layer and the second soft magnetic layer in which the first soft magnetic layer and the second soft magnetic layer are antiferromagnetically coupled to each other and the easy magnetization axis is directed in the radial direction.

2 Claims, 7 Drawing Sheets

PERPENDICULAR MAGNETIC RECORDING MEDIUM

CROSS-REFERENCE TO RELATED APPLICATION

The instant nonprovisional patent application claims priority to Japanese Patent Application No. 2006-328520 filed Dec. 5, 2006 and which is incorporated by reference in its entirety herein for all purposes.

BACKGROUND OF THE INVENTION

In recent years, there has been a strong demand for increase in the capacity of magnetic recording apparatus such as a magnetic storage device small in the size and large in the capacity is mounted not only to personal computers, but also to domestic electrical products, where improvements have been required for the recording density. While magnetic heads, magnetic recording media, etc., have been developed vigorously, the mainstream of the recording system has been shifted from the longitudinal magnetic recording system to the perpendicular magnetic recording system and, further, improvement for the recording density has become possible. In the perpendicular magnetic recording medium, it has been known that the efficiency of applying recording magnetic fields from a magnetic head can be improved by adopting a 2-layered perpendicular magnetic recording medium having a soft-magnetic underlayer and this can also cope with the increase of the coersivity of the recording film.

Basically, for providing a role of circulating a recording magnetic field from a magnetic head, it is necessary for the soft-magnetic underlayer to form a thick soft magnetic material of high saturation magnetic flux density (Bs) compared with that of the recording layer and, accordingly, this has resulted in a problem of noises attributable to the soft-magnetic underlayer. The main cause of the noises is attributable to the leakage of magnetic fields from a magnetic domain wall formed in the soft magnetic layer, and a method of suppressing generation of magnetic domain walls or a method of decreasing the leakage of magnetic fields has been studied.

Japanese Patent Publication No. 2001-155321 ("patent document 1") proposes a method of constituting a soft-magnetic underlayer with two or more soft magnetic layers separated from each other by a non-magnetic layer and using Ru for the nonmagnetic film for separation thereby antiferromagnetically exchange-coupling upper and lower soft magnetic layers. Since the leakage magnetic fields from the magnetic domain wall less occur when the magnetizing direction of the stacked soft magnetic layer is reversed, this provides an effect of suppressing spike noises or demagnetization in recorded magnetization and improving the stray magnetic field resistance with no provision of the magnetic domain control layer. Japanese Patent Publication No. 2004-348777 ("patent document 2") discloses a method of providing an antiferromagnetic layer or a pinned layer below the exchange-coupled soft-magnetic underlayer thereby controlling the anisotropy of the soft-magnetic underlayer. This is a method of decreasing the leakage magnetic fields by controlling the magnetic domain in the soft-magnetic underlayer and suppressing the magnetic domain wall. However, while the magnetic property of the soft-magnetic underlayer can be controlled, it is not practical to adopt a single magnetic domain structure and the magnetic domain wall cannot be eliminated completely.

On the other hand, Japanese Patent Publication No. Hei 1-267834 ("patent document 3") proposes provision of a circumferential texture to a substrate for improving the air-bearing property of a magnetic head. Then, as described, for example, in Japanese Patent Publication No. Hei 6-103554 ("patent document 4"), it has been known that when a soft magnetic layer is formed by using a textured substrate, the easy magnetization axis of magnetic anisotropy tends to be directed easily in the direction of the texture by the shape effect.

Further, Japanese Patent Publication No. Sho 63-74121 ("patent document 5") discloses a method of forming an easy magnetization axis in the direction forming 90° relative to the tensile direction by film-forming the soft magnetic layer having a negative magnetic strain constant while applying tension mechanically to the substrate. Japanese Patent Publication No. Hei 7-235034 ("patent document 6") shows an example of using a Co series negative magnetic strain soft magnetic material.

A method of exchange-coupling two or more soft magnetic layers is extremely effective in that noises attributable to the soft-magnetic underlayer are decreased. However, it is impossible to adopt the soft magnetic layer into a single magnetic domain structure as described above. In addition, it is difficult to align the direction of the magnetic anisotropy of the soft magnetic layer to one direction by the reasons to be described below. At first, in the current method of forming a film generally by using a magnetron sputtering apparatus, since the leakage magnetic fields from a permanent magnet used as a target cathode of the sputtering apparatus distribute radially, the easy magnetization axis of the soft-magnetic underlayer is provided in the radial direction.

On the other hand, since the substrate is a donut disk apertured at the center, magnetization tends to be directed in the circumferential direction at the inner and the outer circumferences by the shape anisotropy, stress, etc. The effect appears more remarkably in the inner circumference, particularly, as the diameter is smaller. Further, in view of the air-bearing property of the magnetic head, it is preferred to use a substrate textured in the circumferential direction but magnetization further tends to be directed in the circumferential direction by the shape effect. With such composite factors, while the easy magnetization axis is provided relatively in the radial direction from the intermediate circumference to the outer circumference of the substrate, easy magnetization axis is tilted in the circumferential direction at the inner circumference to cause distribution in the anisotropy within the plane of the substrate.

Further, the influence of the shape effect increases in the thin soft-magnetic underlayer. Further, in a soft magnetic layer using exchange-coupling, since the leakage magnetic field in the lower layer reduced with the thickness is small, this results in a problem that the easy magnetization axis of the upper layer is less in antiparallel with the lower layer. Accordingly, when the thickness of the soft-magnetic underlayer formed by using a sputtering apparatus is reduced, the easy magnetization axis tends to be tilted to the circumferential direction from the radial direction.

BRIEF SUMMARY OF THE INVENTION

Embodiments in accordance with the present invention help to attain an excellent perpendicular recording medium of high medium signal-to-noise (S/N), and with suppressed blurring in writing. According to one embodiment, a perpendicular recording layer is provided by way of a negative magnetic strain soft-magnetic underlayer above a substrate applied with texturing in the circumferential direction. The soft-magnetic underlayer has a first soft magnetic layer, a second soft magnetic layer and a nonmagnetic magnetic layer formed between the first soft magnetic layer and the second soft magnetic layer in which the first soft magnetic layer and the second soft magnetic layer are antiferromagnetically coupled to each other and the easy magnetization axis is directed in the radial direction.

DETAILED DESCRIPTION OF THE INVENTION

Figure 1:
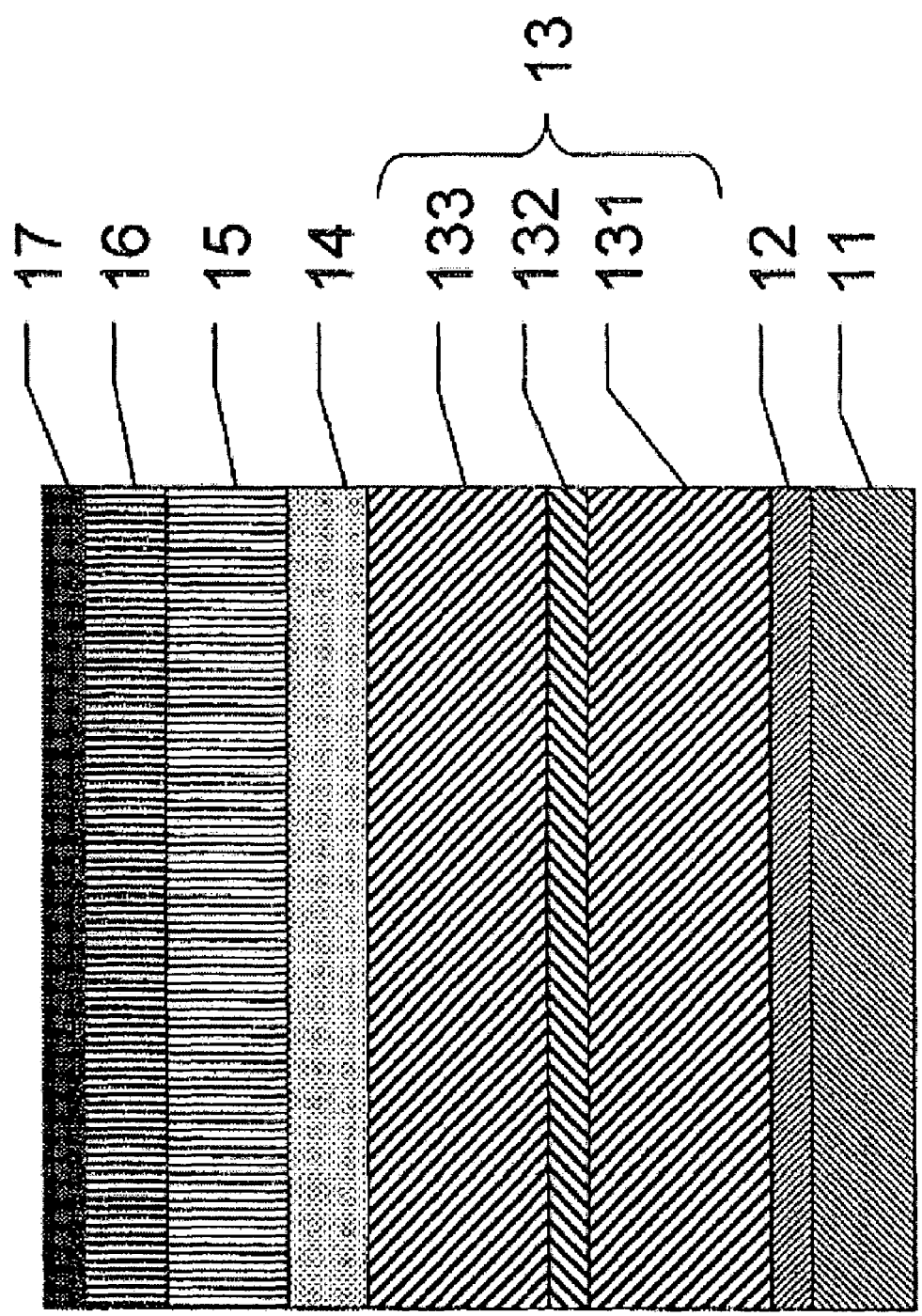
FIG. 1 is a schematic cross sectional view showing a structural example of a perpendicular magnetic recording medium according to an embodiment of the invention.

Embodiments of the present invention concern a magnetic recording medium capable of recording a large capacity of information and, particularly, relate to a perpendicular magnetic recording medium suitable to high density magnetic recording.

Embodiments of the present invention intend to provide a perpendicular magnetic recording medium capable of reducing noises attributable to the soft-magnetic underlayer and suppressing blurring in writing.

While a relation between the magnitude of the magnetic anisotropy of the soft-magnetic underlayer and the recording property has been studied thoroughly so far, the direction of the magnetic anisotropy, particularly, the distribution thereof is scarcely taken into consideration. However, we considered that for attaining high recording density exceeding 200 Tb/m$^2$, it is necessary to highly control the magnetic interaction between the soft-magnetic underlayer and the recording head and when we have examined the effect of the in-plane distribution of anisotropy in the soft-magnetic underlayer on the recording property, we have found that the noises attributable to the soft-magnetic underlayer have been decreased and the blurring in writing of the head is also suppressed by providing the anisotropy easy axis in the radial direction and making the in-plane distribution of the anisotropy uniform.

Embodiments of the invention provide a perpendicular magnetic recording medium of decreasing the noises attributable to the soft-magnetic underlayer and suppressing blurring in writing by providing the easy axis of magnetic anisotropy of the soft-magnetic underlayer uniformly in the radial direction, without providing a layer for controlling the anisotropy of the soft-magnetic underlayer.

In the perpendicular magnetic recording medium according to embodiments of the invention, a perpendicular recording layer is disposed by way of a soft-magnetic underlayer above a substrate applied with texture in the circumferential direction. The soft-magnetic underlayer has a first soft magnetic layer, a second soft magnetic layer and a non-magnetic layer formed between the first soft magnetic layer, and the second soft magnetic layer, in which the first soft magnetic layer and the second soft magnetic layer are antiferromagnetically coupled with each other. Further, an average angle formed between the easy magnetization axis of the anisotropy of the first soft magnetic layer and the second soft magnetic layer and the radial direction of the substrate is within 5 degree.

As a method for providing the easy magnetization axis of the anisotropy of the first soft magnetic layer and the second soft magnetic layer in the radial direction of the substrate, a soft-magnetic underlayer having a negative magnetic strain constant is formed on a substrate applied with a texture in the circumferential direction. The soft magnetic layer showing the negative magnetic strain constant is a material formed by adding an element such as Ta, Mo, W, Hf, and Ni by a predetermined ratio or more to a soft magnetic material comprising at least one of Fe, Co, and Ni as a main ingredient.

According to embodiments of the invention, not only the medium noises attributable to the soft-magnetic underlayer can be decreased but also blurring in writing of the head can be suppressed, and the recording characteristic can be made uniform in a plane, and a high density perpendicular magnetic recording medium of uniform writing/reading characteristic can be provided.

FIG. 1 is a schematic cross sectional view showing an example of a structure of a perpendicular magnetic recording medium of an embodiment of the invention. In the medium, a soft-magnetic underlayer 13, an intermediate layer 15, a perpendicular recording layer 16, and a protective layer 17 are formed in this order above a substrate 11 applied with a texture in a circumferential direction. The soft-magnetic underlayer 13 has a first soft magnetic layer 131, a second soft magnetic layer 133, and a non-magnetic layer 132 formed between the first soft magnetic layer and the second soft magnetic layer, in which the first soft magnetic layer and the second soft magnetic layer are antiferromagnetically coupled. An adhesion layer 12 can be disposed between the substrate 11 and the soft-magnetic underlayer 13. Further, a seed layer 14 can be disposed between the soft-magnetic underlayer 13 and the intermediate layer 15.

Figure 2A:
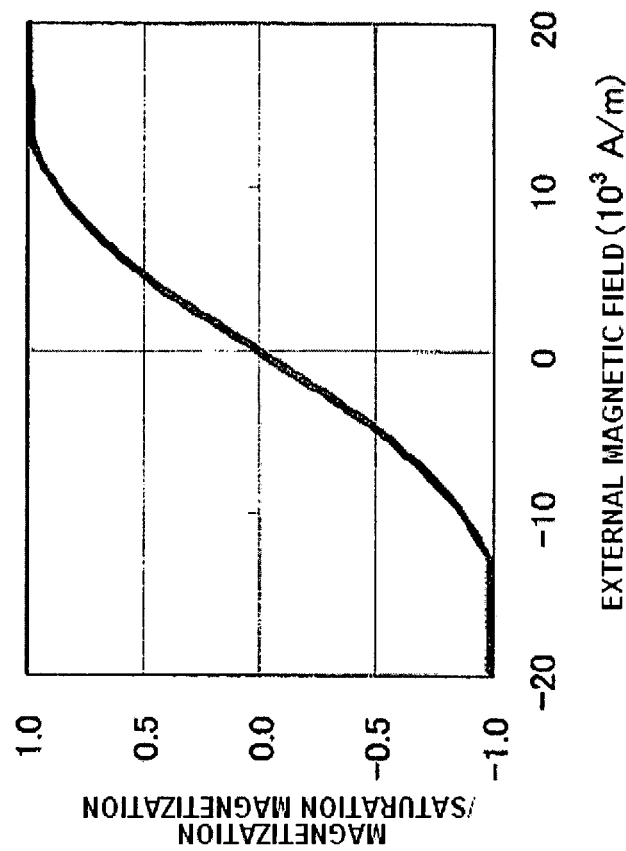
FIGS. 2(a) and 2(b) are graphs showing a magnetization curve for a soft-magnetic underlayer of an example (medium A) according to an embodiment of the invention.
Figure 2B:
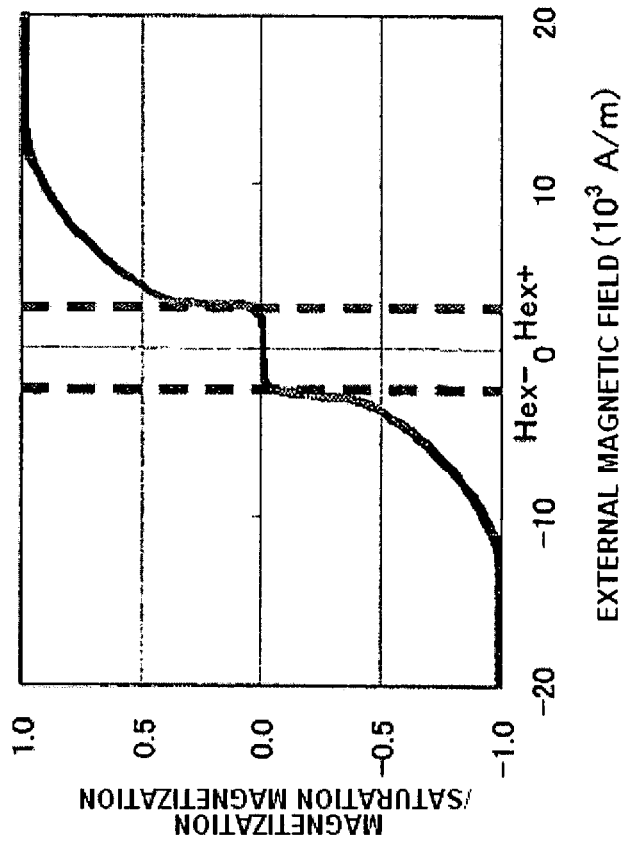

A magnetization curve measured by applying a magnetic field to the direction of an easy axis of the soft-magnetic underlayer 13 is substantially in symmetrical with respect to the original point as shown in FIG. 2(a), and has magnetization of an identical magnitude in a case of applying a magnetic field in both of the side of the positive magnetic field and the side of the negative magnetic field. Further, it is stabilized at a zero or minute magnetization in a certain range of magnetic field including a zero magnetic field. When a magnetic field larger than the stable magnetic field range is applied, the magnetization abruptly turns to the direction of the magnetic field to show a soft magnetic property. The stable magnetic field range is defined as an exchange magnetic field Hex, which can be quantified as a peak value for the differentiation value of the magnetization curve. The magnitude of Hex is substantially determined by the material and the thickness of the soft magnetic layer. On the other hand, in a case of applying the magnetic field in the direction of the difficult magnetization axis, the magnetization curve forms a monotonous curve passing through the original point as shown in FIG. 2(b).

In the soft-magnetic underlayer 13 of embodiments of the invention, it is important that the easy magnetization axis is made uniform in the radial direction with a view point of improving the writing/reading characteristic of the medium. Particularly, for improving the reading characteristic and improving the S/N ratio, it is important that the easy magnetization axis is directed radially. The easy magnetization axis is preferably directed within ±5 degree from the radiation direction.

Further, with a view point of suppressing blurring in writing during writing, the exchange magnetic field Hex measured in the direction of the easy magnetization axis is preferably larger. In a case of fixing the thickness and the material composition of the soft-magnetic underlayer, it is important to narrow the distribution in the direction of the easy magnetization axis for increasing the Hex. Particularly, the standard deviation in the direction of the easy magnetization axis for 8 points measured on every 45° within a circumference at an identical radius of the soft-magnetic underlayer is preferably within 5 degrees.

On the other hand, in a case of using a substrate formed with a texture in the circumferential direction, the easy magnetization axis of the soft magnetic layer tends to be directed in the circumferential direction by the shape effect. Then, in the soft magnetic layer of the magnetic recording medium of embodiments of the invention, a soft magnetic material having a negative magnetic strain constant is used. By the use of the negative magnetic strain effect, the easy magnetization axis can be directed in the radial direction forming 90° with respect to the texturing direction.

Then, description is to be made to a material suitable to embodiments of the invention. As the substrate 11, a donut-type disk apertured at the center using a nonmagnetic substrate such as a glass or aluminum alloy substrate fabricated with textures or shallow grooves in the circumferential direction is suitable. This is for improving the air-bearing property of the head or effectively providing the negative magnetic strain effect of the soft magnetic material. Further, a roughness on the surface of the substrate is preferably from 0.15 nm to 0.5 nm as the average surface roughness Ra with a view point of ensuring the stable air-bearing of the head.

The adhesion layer 12 is disposed preferably between the soft magnetic layer 13 and the substrate 11. The material for the adhesion layer 12 is not particularly restricted so long as it is excellent in the surface planarity but it is necessary that the textured structure of the substrate 11 is reflected on the surface of the adhesion layer 12 and the layer is preferably formed by using an amorphous material or microcrystalline material to a thickness of 30 nm. For example, it is preferably constituted with an alloy containing at least two or more metals of Ni, Al, Ti, Ta, Cr, Zr, Co, Hf, Si, and B. More specifically, NiTa, AlTi, AlTa, CrTi, CoTi, NiTaZr, CrTiAl, etc. can be used.

For the soft magnetic material 13, it is preferred to use an amorphous alloy of excellent surface planarity comprising one or a plurality of elements of Fe, Co, and Ni as a main ingredient, with addition of one or more of elements selected from Ta, Hf, Nb, Zr, Si, B, C, Mo, Al, and W. The amorphous alloy referred to herein means an amorphous or microcrystalline alloy in which no distinct diffraction peaks are observed in X-ray diffractometry.

Further, it is important to make the magnetic strain negative and, for this purpose, it is effective to add an element such as Ta, Mo, W, Hf, Ni, etc. at a predetermined ratio or more. The composition for rendering the negative magnetic strain is dependent on the compositional ratio of Fe, Co, and Ni as the main ingredient, the kind of the element to be added, and the process such as the temperature and the gas pressure during film formation.

For example, in a case of adding Ta and Zr with Co being as a matrix, the magnetic strain can be rendered negative by defining the addition amount of Ta as X at % and the addition amount of Zr as $(X/2-1)$ at %. Further, for forming an amorphous film of excellent surface planarity, it is preferred that the addition amount of Ta is X at % and the addition amount of Zr is Y at %, with $X+3Y$ being 12 or more. Considering them collectively, in a case of the Ta addition amount of X at % and the Zr addition amount of Y at %, an amorphous soft magnetic film of negative magnetic strain can be formed by defining within a range: $X>6$ and $4-X/3<Y<X/2-1$. Further, in a case of adding Ta and Zr to FeCo as a matrix in which Fe is added at a ratio from 50 at % to 70 at % for the Fe and Co compositional ratio, a soft magnetic film having negative magnetic strain and in an amorphous state can be formed by defining as $X>10$ and $Y<X/2-1$ in a case of the Ta addition amount of X at % and the Zr addition amount of Y at %.

The thickness of the soft-magnetic underlayer 13 may be 5 nm or more with a view point of showing the soft magnetic property and 100 nm or less in view of forming the soft-magnetic underlayer that reflects the texture of the substrate. The magnetic strain effect is obtained particularly in a case where the total thickness of the first soft magnetic layer 131 and the second soft magnetic layer 133 is 60 nm or less. For the intermediate layer 15, alloys of nonmagnetic property and in an amorphous or hexagonal closed pack lattice structure or face-centered cubic lattice structure can be used. The intermediate layer may be a single layer film or a multi layer film using materials of different crystal structures. Materials comprising Ru or Ru as a main ingredient with addition of at least one element selected from Co, Fe, Cr, B, and Mo can be used.

For controlling the orientation and the grain size of the intermediate layer 15, the seed layer 14 may be disposed between the soft-magnetic underlayer 13 and the intermediate layer 15. For the material of the seed layer, an element selected from Cr, Ti, Ni, W, Al, Ta, Nb, Cu, Mo, and B or alloys comprising two or more of the elements can be used. The seed layer 14 may be a single layer film or a multilayer film.

For the perpendicular recording layer 16, hcp-Co alloy films of CoCrPt alloy, CoCrPtB alloy, etc., granular films such as $CoCrPt-SiO_2$, etc., and artificial lattice films such as (Co/Pt) multilayer film, (CoB/Pt) multilayer film, and (CoSi/Pt) multilayer film can be used. It may be a single layer film or a multilayer film of them.

For the protective film of the perpendicular recording layer, it is preferred to form a film of 2 nm or more and 5 nm or less mainly comprising carbon and, further, form a lubrication layer such as of a perfluoroalkyl polyether. This can provide a perpendicular recording medium of high reliability.

Specific examples of applying embodiments of the invention are to be described.

EXAMPLE 1

A perpendicular magnetic recording medium having a layer constitution shown in FIG. 1 was manufactured. A glass substrate of 65 mm type was used for the substrate 11, and the adhesion layer 12, the first soft magnetic layer 131, the non-magnetic layer 132, and the second soft magnetic layer 133, the seed layer 14, the intermediate layer 15, the recording layer 16, and the protective layer 17 were formed successively by a sputtering method. Table 1 shows compositions of targets used for film deposition for each of layers, the Ar gas pressure and the film thickness.

TABLE 1

|  | Target composition | Ar gas pressure (Pa) | Thickness (nm) |
|---|---|---|---|
| Adhesion layer 12 | $AlTi_{50}$ | 1 | 5 |
| Soft-magnetic underlayer 13 — First soft magnetic layer 131 | $CoTa_{10}Zr_2$ | 0.5 | 30 |
| Non-magnetic layer 132 | Ru | 0.5 | 0.6 |
| Second soft magnetic layer 133 | $CoTa_{10}Zr_2$ | 0.5 | 30 |
| Seed layer 14 | Ta | 0.5 | 2 |
| Intermediate layer 15 | Ru | 0.5/6.5 | 8/8 |
| Recording layer 16 | $CoCrPt—SiO_2$ | 6.5 | 14 |
|  | CoCrPt | 0.5 | 8 |
| Protective layer 17 | Carbon | 1 | 4 |

For the substrate 11, a substrate applied with a texture in the circumferential direction and having an average surface roughness Ra of 0.25 nm was used.

At first, a manufacturing method is to be described. AlTi as the adhesion layer 12 and $CoTa_{10}Zr_2$ as the first soft magnetic layer 131 were formed above the substrate 11. Then, Ru as the non-magnetic layer 132 and $CoTa_{10}Zr_2$ as the second soft magnetic layer 133 were formed. Further, the substrate was cooled to 70° C. by using a helium gas in a magnetic field, and Ta as the seed layer 14 and Ru as the intermediate layer 15 were formed. A $CoCrPt—SiO_2$ granular film and a CoCrPt alloy film were formed successively as the recording layer 16 above them. Then, carbon as the protective 20 was formed. The magnitude of the magnetic field during cooling was 8 kA/m with the substrate as the center. Then, a lubricant formed by diluting a perfluoroalkyl polyether type material with a fluorocarbon material was coated and the surface was applied with vanishing to manufacture a perpendicular recording medium A.

For comparison, a medium B using $CoTa_3Zr_5$ for the soft magnetic material was provided. Film forming conditions such as a gas pressure, a temperature and a film forming rate during deposition of the soft-magnetic underlayer, as well as other layer constitution, film thickness and the specification of the substrate used for the medium of the comparative example were identical with those for the example.

At first, the magnetic strain of the soft magnetic material was measured by using M-H loop tracer (TS-MK5KT08) manufactured by Tesla Co. The magnetic strain of $CoTa_{10}Zr_2$ as the example was about $-7 \times 10^{-7}$ and that of $CoTa_3Zr_5$ as the comparative example was $15 \times 10^{-7}$.

Then, the evaluation for the property of the manufactured medium A is to be described. At first, the magnetic property of the soft magnetic layer was evaluated by using a sample vibration magnet meter (VSM). A magnetization curve in the radial direction and the circumferential direction of a sample cut to 8 mm square with the position at 23 mm radius being as the center was measured for the medium A. The result is shown in FIG. 2(a).

FIG. 2(a) showing the magnetization curve of this example measured by applying a magnetic field in the radial direction of the substrate is in a stepped shape having a stable level within a range of certain magnetic fields including a zero magnetic field. This shows that the easy magnetization axis of the soft-magnetic underlayer is directed in the radial direction, and shows that the first soft magnetic layer 131 and the second soft magnetic layer 133 are antiferromagnetically coupled within the range of the magnetic filed at the stable level. The transition magnetic field from the stable level is defined as an exchange magnetic field Hex. In the magnetization curve of FIG. 2(a) as the result of actual measurement, Hex+ and Hex− in the graph as the maximal values of the gradient are symmetrical with respect to the axis Y as the center and the magnitude of them are substantially equal, and the average value for them can be defined as the exchange magnetic field Hex of the soft-magnetic underlayer. Hex of the medium A of the examples was about 2.6 kA/m.

On the other hand, FIG. 2(b) as the magnetization curve measured by applying a magnetic field in the circumferential direction of the substrate changes monotonously from the original point to the vicinity of the saturation magnetic field. This just shows that the circumferential direction is the direction of the difficult magnetization axis and it can be seen therefrom that the anisotropy of the soft-magnetic underlayer in the medium A of this example is directed to the radial direction.

Further, the direction of the magnetic anisotropy and the magnitude of Hex of the soft-magnetic underlayer were evaluated by using an optroscope that utilizes the magnetic Kerr effect. The optroscope can examine the magnetic property of the soft-magnetic underlayer at an optional position on a desk without cutting the substrate. This apparatus measures the magnetic Kerr effect for a minute region of about a laser spot diameter (about 2 mm φ) by applying a maximum application magnetic field 16 kA/m by a Helmholtz coil in the in-plane direction of the substrate, irradiating a semiconductor laser at a wavelength of 800 nm to the substrate and detecting the reflection wave by a photodiode. The substrate can freely move and rotate in the Helmholtz coil, and the Kerr effect can be measured at an optional position of a medium substrate for optional directions within the plane including the radial direction and the circumferential direction.

Figure 3:
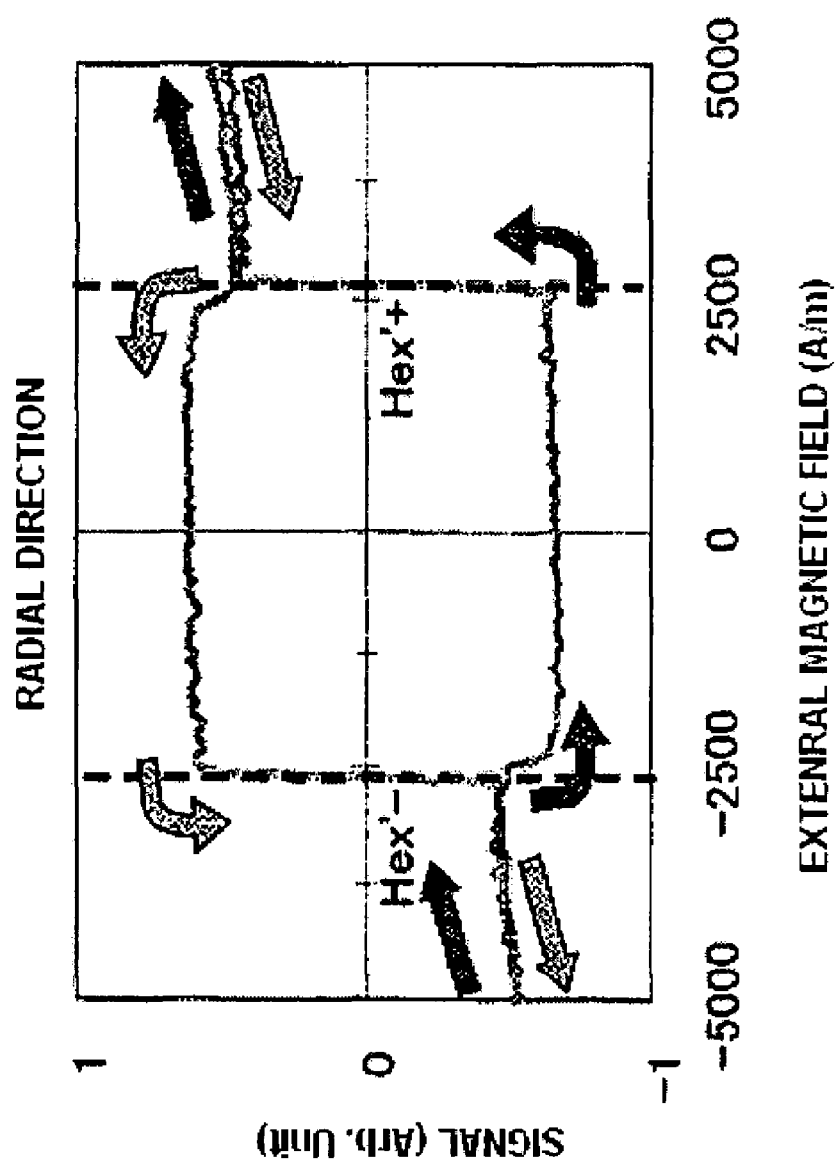
FIG. 3 is a graph showing a Kerr effect output curve of an example (medium A) according to an embodiment of the invention.

FIG. 3 shows an example of the result of conducting measurement for the radial direction at a position for 23 mm radius of the medium A. The Kerr output curve measured in the radial direction, that is, in the direction of the easy magnetization axis is in a rectangular shape having hysteresis in the vicinity of the residual magnetic field substantially in symmetrical with respect to the original point. Assuming intersections of the rectangular shape and the x axis are Hex'+, and Hex'− respectively, the average Hex' for the magnitude of Hex'+ and Hex'− is about 2.6 kA/m and it can be seen that this is substantially equal with Hex upon measurement by VSM.

Figure 4:
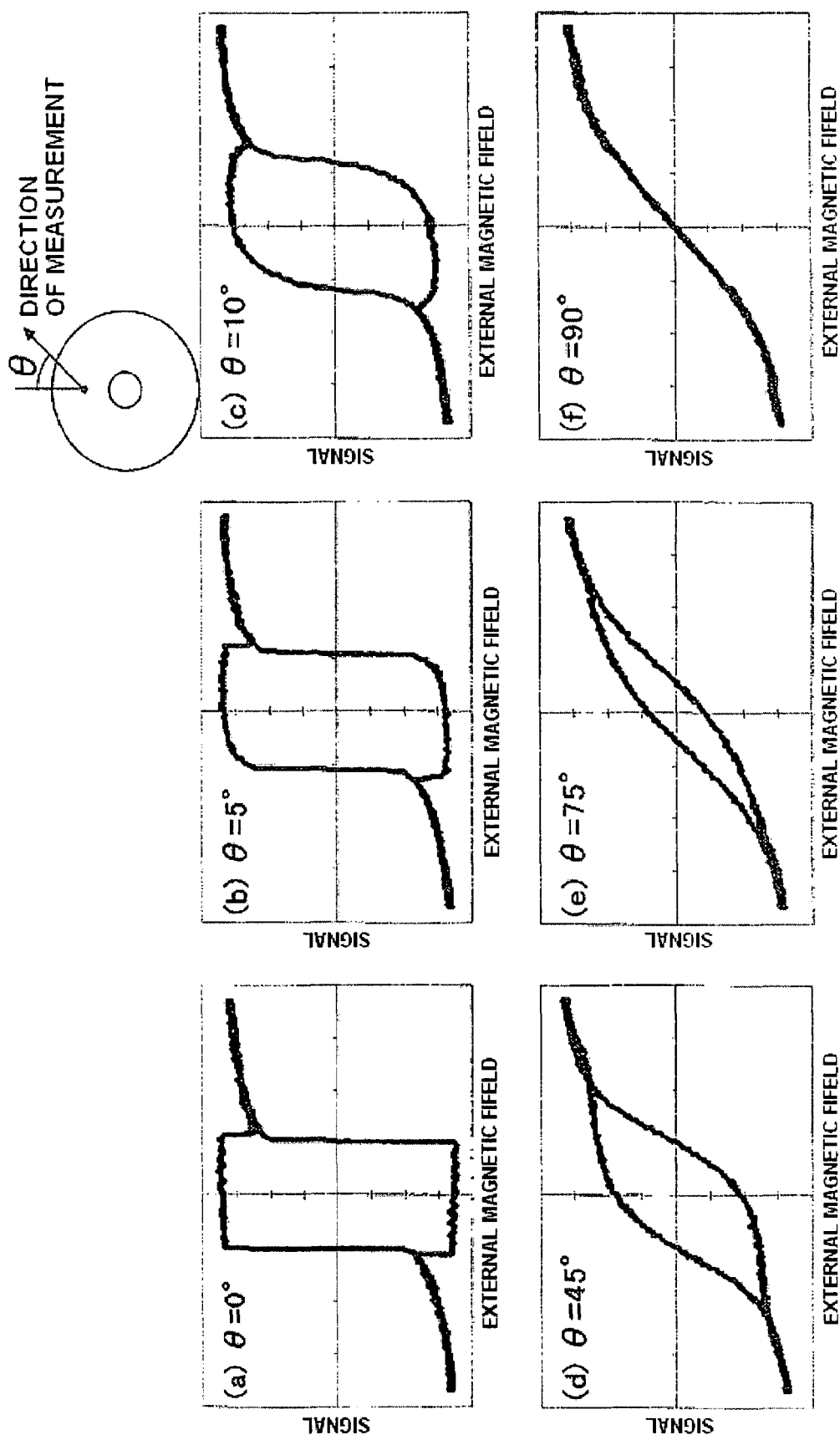
FIGS. 4(a)-4(f) are graphs showing the dependence of the Kerr effect output curve on the measuring direction of the example (medium A) according to an embodiment of the invention.

For accurately evaluating the direction of the easy magnetization axis of the soft-magnetic underlayer, measurement was conducted by the following sequence. The Kerr effect was measured while rotating the substrate each by 1° from the state of directing the magnetic field and the laser in the radiation direction of the medium A thereby tilting the direction of the magnetic field and the laser from the radial direction. FIG. 4 shows typical Kerr output curves when the substrate is rotated by θ in the radial direction. The radial position of the measured substrate is 23 mm. The Kerr output curve measured in the radial direction (θ=0°) shows a rectangle hysteresis having corners as shown in FIG. 4(a). As the substrate is rotated and the laser is tiled in the circumferential direction, the corners of the rectangle observed in FIG. 4(a) are rounded (FIG. 4(b), θ=5°) and when the substrate is rotated further, the Kerr output curve shows an obliquely tilted parallelogram (FIG. 4(c) θ=10°), and a rhombic shape with corners being removed (FIG. 4(d), θ=45°). When θ is further increased, the hysteresis decreases contrarily (FIG. 4(e), θ=75°) and when θ is rotated up to 90° and the effect is measured with the laser being directed finally in the circumferential direction, it shows a monotonously changing curve with no hysteresis as shown in FIG. 4(f). It can be seen that the Kerr output curve of FIG. 4(f) is a curve substantially identical with the magnetization curve in the circumferential direction measured by VSM. Among them, since it is easy to examine the angle that forms a curve with no hysteresis as shown in FIG. 4(f) in the direction of the difficult magnetization axis, it can be defined that the angle where the hysteresis disappears as shown in FIG. 4(f) is the difficult magnetization axis, the direction tilted by 90° from the difficult magnetization axis is the easy magnetization axis.

For example, a medium B of a comparative example was measured by using the optroscope while rotating the substrate each by 1° in the same manner as described above. The radial position is 23 mm. In the medium B, the angle where the hysteresis disappears (difficult magnetization axis) is tilted by 105° from the radial direction. In view of the foregoings, it can be seen that the easy magnetization axis is in the direction tilted by 15° from the radial direction.

For the medium A of the example and the medium B for the comparative example, the in-plane distribution was examined by using the method described above for Hex' in the direction of the easy magnetization axis and the tilting of the easy magnetization axis from the radial direction for the 15 nm radial position (inner circumference), 23 mm (intermediate circumference) and 31 mm (outer circumference). Measurement was conducted on 8 points on every 45° in the circumferential direction at each radial position. Table 2 shows the result. The table shows the average for Hex' at each radius (Hex), average for the tilting of the easy magnetization axis (θ) and the distribution of the angle as the standard deviation σ.

The result described above shows that the direction of the easy magnetization axis of the soft-magnetic underlayer 13 is directed easily in the radial direction by using the negative strain material.

Figure 5B:
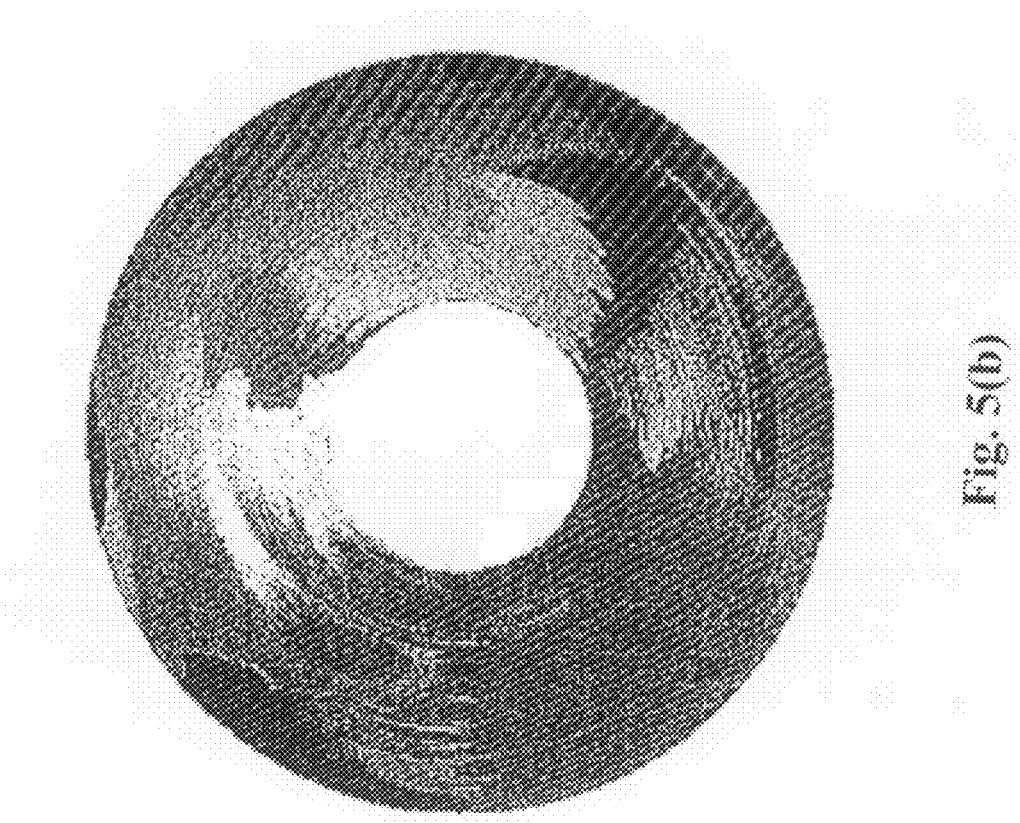
FIGS. 5(a) and 5(b) are views showing a magnetic domain structure of a medium A according to an embodiment of the invention and Comparative Example B.
Figure 5A:
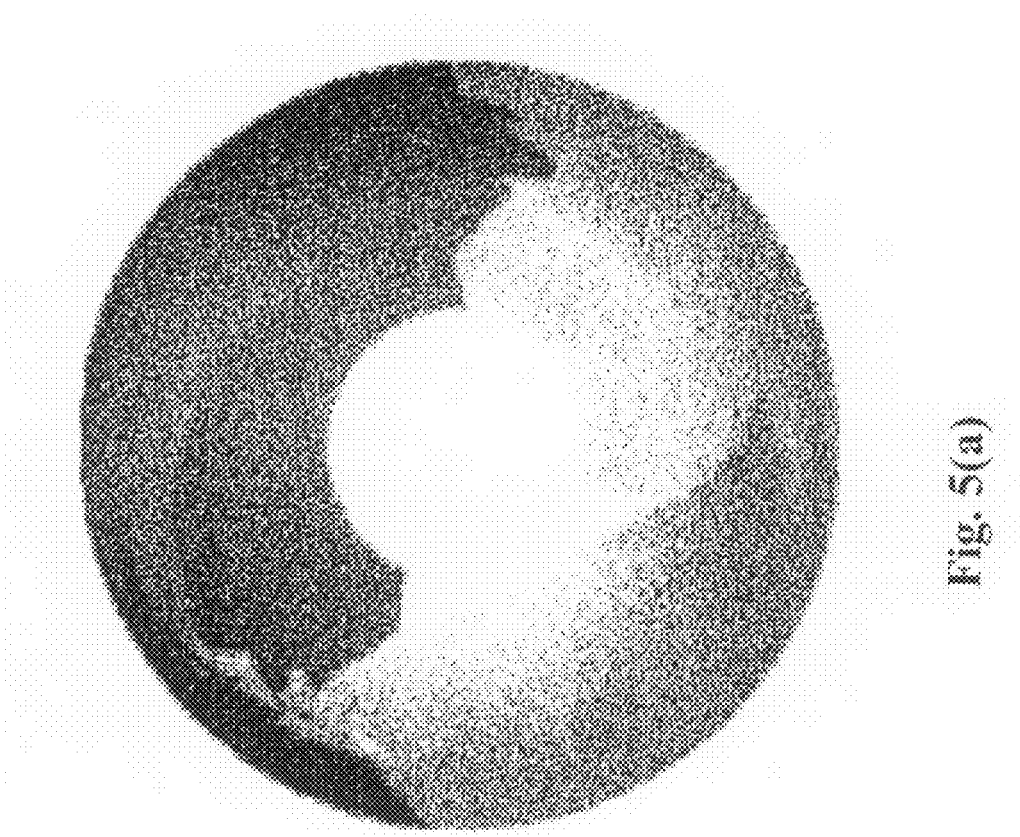

Then, for examining the in-plane distribution of the direction of the magnetic anisotropy of the soft-magnetic underlayer specifically, magnetic domain images were observed. Magnetic domain images for the soft-magnetic underlayers of the medium A and the medium B were observed by using an optical surface observation apparatus (Candela OSA-2120). The result is shown in FIG. 5. In the medium A according to the invention, the entire substrate shows a pedal-like pattern with a large magnetic domain as shown in FIG. 5(a) which shows that the in-plane dispersion of magnetic anisotropy is small. Further, it can also be seen that since the magnetic domain wall extends in the radial direction, the direction of the easy magnetization axis is in the radial direction.

On the other hand, in the medium B of the comparative example, magnetic domain walls as if swept by a broom in the circumferential direction are shown and finer magnetic domains are present compared with the medium A. The magnetic domain extending in the circumferential direction shows that the easy magnetization axis is directed in the circumferential direction and the fineness of the magnetic domains shows that the direction of the easy magnetization axis is not uniform and the dispersion is large. Upon close observation on every radial position, while magnetic domain walls extending slightly in the radial direction are observed at the outer circumference, most of magnetic domain walls are directed to the circumferential direction in the inner circumference. Further, it can be seen that the magnetic domains are

TABLE 2

| | | | Inner circumference (15 mm radius) | | | Intermediate circumference (23 mm radius) | | | Outer circumference (31 mm radius) | | |
|---|---|---|---|---|---|---|---|---|---|---|---|
| | Medium | Soft magnetic layer composition | Exchange magnetic field (Hex) (kA/m) | Direction of easy magnetization axis (θ) (degree) | Standard deviation σ (degree) | Exchange magnetic field (Hex) (kA/m) | Direction of easy magnetization axis (θ) (degree) | Standard deviation σ (degree) | Exchange magnetic field (Hex) (kA/m) | Direction of easy magnetization axis (θ) (degree) | Standard deviation σ (degree) |
| Example | A | $CoTa_{10}Zr_2$ | 2.57 | 2.1 | 1.5 | 2.62 | 1.5 | 0.9 | 2.65 | 0.6 | 0.9 |
| Comp. Example | B | $CoTa_3Zr_5$ | 2.43 | 85.8 | 2.5 | 1.62 | 38.8 | 10.5 | 2.62 | 1.0 | 0.87 |

The direction of the easy magnetization axis (θ) of the soft magnetic layer in the medium A using the negative magnetic strain material was confined to about 2° over the entire radius, and the standard deviation σ at an identical radius is also as small as within 1.5°. Further, the (Hex) value was also stable at 2.5 kA/m or more.

On the other hand, while the direction of the easy magnetization axis (θ) of the medium B of the comparative example using a positive magnetic strain gives a value identical with that for the medium A at the outer circumference, it increases more toward the intermediate circumference and the inner circumference and it can be seen that the easy magnetization axis is tilted greatly in the circumferential direction at the inner circumference. The standard deviation was greatest at the intermediate circumference as 10.5° and it was 2.5° also at the inner circumference. Further, also the value "Hex" was greatly decreased at the intermediate circumference like the standard deviation σ.

further finer in the intermediate circumference. Also in view of the magnetic domain images, in the medium B of the comparative example using the positive magnetic strain material, it can be seen that the tilting of the easy magnetization axis increases toward the inner circumference, and the dispersion of the tilt angle is largest in the intermediate circumference.

Figure 6:
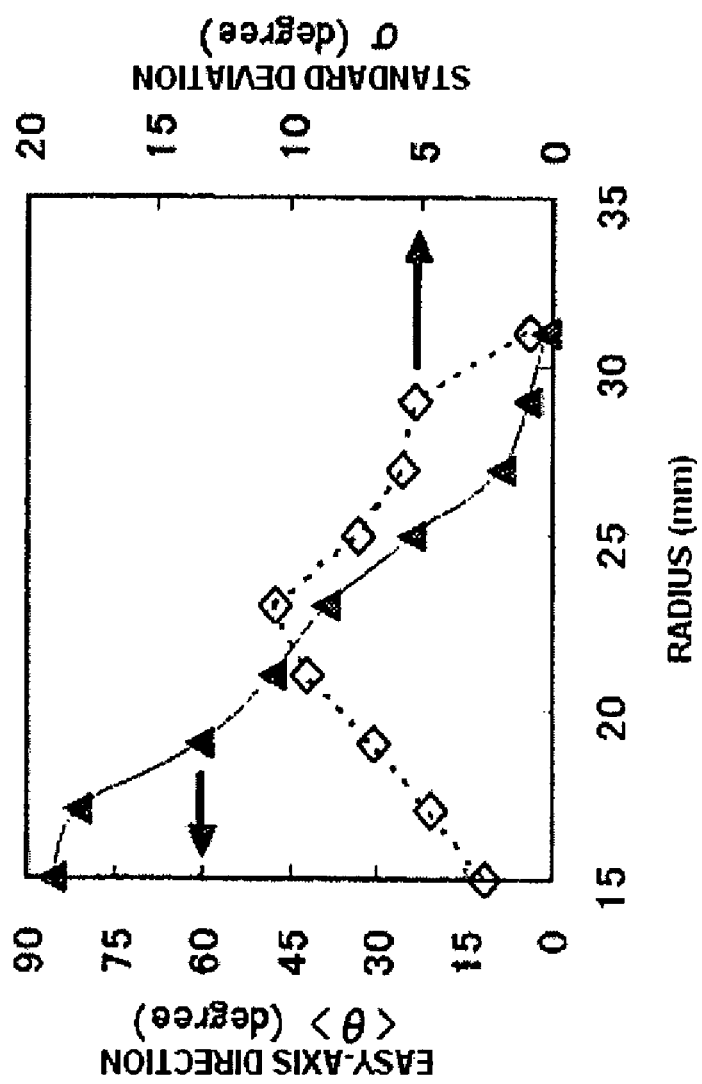
FIG. 6 is a view showing the direction of easy magnetization axis and standard deviation for a soft magnetic layer of the Comparative Example B.

For supporting the result of the observation for the magnetic domain images, the tilting θ of the direction of the easy magnetization from the radial direction was measured for 8 points on every 45° as described above, at each 2 mm interval for 15 mm to 31 mm radius, for examining the in-plane distribution of the magnetic anisotropy of the soft-magnetic underlayer of the medium B of the comparative example more specifically by using the optroscope. FIG. 6 shows the average of the tilting (θ) of the soft-magnetic underlayer in the direction of the easy magnetization axis and the standard deviation σ on every measured radius. It can be seen that the average of the direction of the easy magnetization axis tilts substantially monotonously from the radial direction to the circumferential direction as from the outer circumference to the inner circumference. On the other hand, while the standard deviation σ is small in the outer circumference directed to the radial direction and in the inner circumference directed to the circumferential direction and the easy magnetization axis is aligned uniformly, whereas the standard deviation σ increases in the vicinity of the intermediate circumference where the easy magnetization axis is between the radial direction and the circumferential direction and it can be seen that the direction of the easy magnetization axis is not uniform. The result well agrees with the result of the observation for the magnetic domain shown before.

S/N could be obtained in any of inner, intermediate and outer circumferences and the value of MWW was also substantially identical. On the other hand, in the medium B of the comparative example, while S/N and MWW identical with those of the medium A were obtained at the outer circumference, degradation of S/N and increase of MWW were observed from the intermediate circumference to the inner circumference. Particularly, remarkable degradation of S/N and increase of MWW were observed at the intermediate circumference where (Hex) was small and the standard deviation was large. At the inner circumference, degradation of S/N was observed irrespective that (Hex) was large and the standard deviation was small.

TABLE 3

| | | Soft magnetic layer | Inner circumference 15 mm radius | | Intermediate circumference 23 mm radius | | Outer circumference 31 mm radius | |
| --- | --- | --- | --- | --- | --- | --- | --- | --- |
| | Medium | composition | S/N (dB) | MWW (nm) | S/N (dB) | MWW (nm) | S/N (dB) | MWW (nm) |
| Example | A | $CoTa_{10}Zr_2$ | 21.0 | 148 | 20.8 | 147 | 20.5 | 147 |
| Comp. Exam. | B | $CoTa_3Zr_5$ | 15.9 | 149 | 15.2 | 160 | 20.3 | 148 |

From the result described above, it can be seen that the magnetic anisotropy of the soft-magnetic underlayer changes continuously from the inner circumference to the outer circumference. Particularly, it is shown that the effect that the easy magnetization axis attributable to the shape of the substrate and the shape effect of the texture structure is directed to the circumferential direction is greatest on the side of the inner circumference and it decreases toward the outer circumference and the direction of the easy magnetization axis for the entire substrate can be recognized by examining the inner circumference and the outer circumference. Further, in a case where the direction of the easy magnetization axis is different greatly in the circumferential direction and the radial direction between the inner circumference and the outer circumference, it shows that the direction of the easy magnetization axis is most instable and the dispersion increases at the intermediate circumference of the substrate. From the foregoings, it can be seen that the direction of the easy magnetization axis and the distribution over the entire the substrate can be determined by conducting evaluation on the inner circumference, intermediate circumference and the outer circumference of the substrate.

Then, for examining a relation between the easy magnetization axis of the soft-magnetic underlayer and the writing/reading characteristic of the medium, the writing/reading characteristic of the medium A of the example and the medium B of the comparative example were evaluated by using a spin stand. The head used for the evaluation is a composite magnetic head having a reading device that utilizes a giant magnet resistive effect having a shield gap length of 60 nm and a track width of 65 nm, and a single pole writing device of 90 nm track width. Reading output and noises were measured under the condition at a circumferential speed of 10 n/s, a squaw angle of 0°, and a magnetic spacing of about 15 nm, and the S/N property was determined as a ratio of the isolate wave reading output when recording signals at a linear recording density of 2690 fr/mm and integration noises when recording signals of linear recording density of 26900 fr/mm.

Figure 7B:
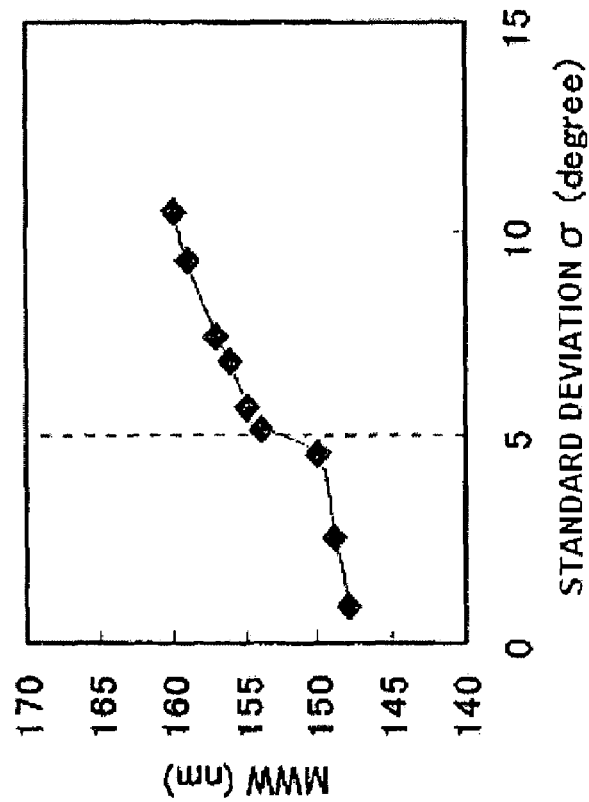
FIGS. 7(a) and 7(b) are graphs showing a relation between the direction of the easy magnetization axis and the medium property (S/N and MWW) of Comparative Example B.
Figure 7A:
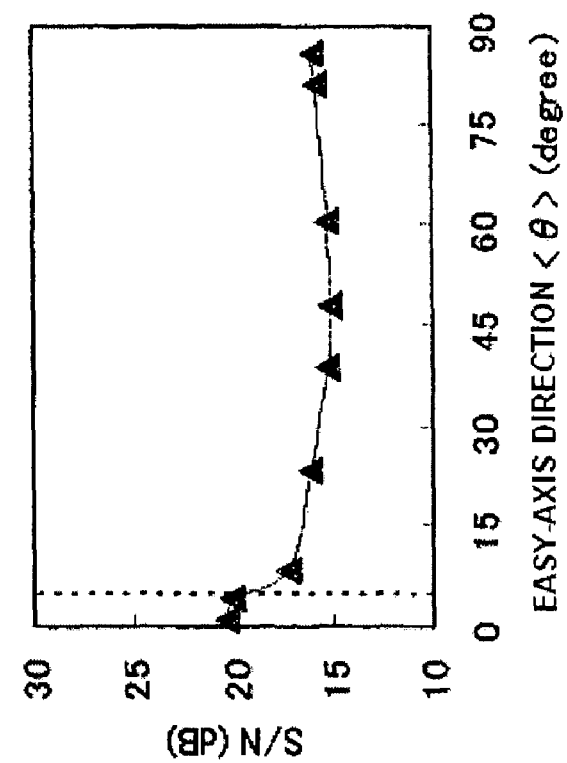

Table 3 shows the S/N property and the value of MWW according to IDEMA definition showing blurring in writing in the radial direction. In the medium A of the example, stable Then, for specifically examining the cause for the degradation of the property of the medium B of the comparative example, the S/N property and MWW were evaluated from 15 mm to 31 mm radius at 2 mm interval. FIG. 7(a) shows a relation between the S/N and the direction of the easy magnetization axis and FIG. 7(b) shows a relation between the MWW and the standard deviation. In a case where the direction of the easy magnetization axis tilted greatly from the radial direction by more than 5°, abrupt degradation of the S/N was observed. Further, in a case where the dispersion in the direction of the easy magnetization axis (standard deviation) was increased by 5° or more, the MWW widened greatly. That is, it has been found that the tilting of the easy magnetization axis is closely concerned with the S/N property and the dispersion of tilting was closely concerned with the MWW.

It has been known that noises attributable to the soft-magnetic underlayer are particularly large among the S/N property of the medium. Particularly, the magnetic domain walls remarkably cause noises. As can be seen from the magnetic domain images in FIG. 5, since the magnetic domain walls causing the noises can be decreased greatly by directing the easy magnetization axis of the soft-magnetic underlayer in the radial direction, it is considered that direction of the axis of the easy magnetization to the radial direction contributes to the improvement of the S/N property.

On the other hand, it is considered for the widening of the MWW that (Hex) is decreased by the increase of the dispersion of the easy magnetization axis of the soft magnetic layer. As (Hex) decreases, since the magnetization of the soft-magnetic underlayer is directed to the direction of the head magnetic field even in a region where the head magnetic field during writing is small, the magnetic field at the edge of the bit in the writing layer increases to cause blurring in writing.

From the result described above, it can be seen that for obtaining a perpendicular magnetic recording medium of favorable S/N property and less blurring in writing, it is important that the easy magnetization axis of the soft-magnetic underlayer is directed to the radial direction and the dispersion of tilting thereof is small. Particularly, it was found that the average tilting from the radial direction is suppressed within 5°, and the standard deviation for the tilting at the identical radius is decreased to less than 5°.

EXAMPLE 2

By using a substrate of the same specification as in Example 1, medium C and medium D with the thickness of the soft magnetic layer being changed and medium E and medium F of a comparative example by using the same positive magnetic strain material identical with the comparative example of Example 1 were manufactured with the same layer constitution and film deposition condition as those in Example 1.

The thickness for one layer of the soft-magnetic underlayer of the medium C and the medium E was 30 nm and the thickness of the medium D and the medium F was 15 nm. For the media, evaluation for the magnetic property of the soft-magnetic underlayer by the optroscope and the evaluation for the writing/reading characteristic were conducted. Measurement was conducted for 8 points at each 15 mm, 23 mm, 31 mm interval in the radial direction and at 45° interval in the circumferential direction. Table 4 and Table 5 show the result. For comparison, results for the medium A and the medium B of the comparative example manufactured in Example 1 are also shown together.

In this example, while the tilting of the easy magnetization axis tends to increase somewhat as the thickness of the soft-magnetic underlayer is reduced, the standard deviation scarcely changes. Further, it can be seen that while (Hex) lowers somewhat at the inner circumference but it is substantially stabilized. On the other hand, in a case of the comparative example, the region where the easy magnetization axis tilts in the circumferential direction due to the reduction of the thickness extends from the inner circumference to the outer circumference and the inner circumference is completely directed to the circumferential direction, while the distribution from the intermediate circumference to the outer circumference increases to result in a region where (Hex) decreases in a place where the standard deviation increases. It was found that in accordance with the change of the property of the soft-magnetic underlayer, an S/N which is stable for the entire radius and an MWW of 150 nm or less were obtained in the media C and D of the example, whereas the MWW decreases at the intermediate circumference and the inner circumference but the S/N was degraded and the MWW is widened at the outer circumference to worsen the property over the entire circumference as the thickness of the soft magnetic layer decreases.

In view of the above, it was found that tilting and dispersion of the easy magnetization axis are suppressed by using the negative magnetic strain material for the soft-magnetic underlayer even when the thickness of the soft-magnetic underlayer is reduced, and a favorable medium having stable S/N property and MWW can be obtained.

TABLE 4

| Medium | Soft magnetic layer composition | Thickness of first and second soft-magnetic underlayer (nm) | Inner circumference (15 mm radius) | | | Intermediate circumference (23 mm radius) | | | Outer circumference (31 mm radius) | | |
|---|---|---|---|---|---|---|---|---|---|---|---|
| | | | Exchange magnetic field (Hex) (kA/m) | Direction of easy magnetization axis (θ) (degree) | Standard deviation σ (degree) | Exchange magnetic field (Hex) (kA/m) | Direction of easy magnetization axis (θ) (degree) | Standard deviation σ (degree) | Exchange magnetic field (Hex) (kA/m) | Direction of easy magnetization axis (θ) (degree) | Standard deviation σ (degree) |
| Exam. A | $CoTa_{10}Zr_2$ | 50 | 2.57 | 2.1 | 1.5 | 2.62 | 1.5 | 0.9 | 2.65 | 0.6 | 0.9 |
| C | | 30 | 4.36 | 2.5 | 1.5 | 4.36 | 2.0 | 1.7 | 4.42 | 1.6 | 1.3 |
| D | | 15 | 6.05 | 3.3 | 2.0 | 6.11 | 2.8 | 1.4 | 6.18 | 1.8 | 1.2 |
| Com. Exam. B | $CoTa_3Zr_5$ | 50 | 2.43 | 85.8 | 2.5 | 1.62 | 38.8 | 10.5 | 2.62 | 1.0 | 0.87 |
| E | | 30 | 4.30 | 87.1 | 2.4 | 2.70 | 66.3 | 9.2 | 2.85 | 15.6 | 7.3 |
| F | | 15 | 5.95 | 87.4 | 1.9 | 5.81 | 79.1 | 4.5 | 4.50 | 33.9 | 8.7 |

TABLE 5

| Medium | Soft magnetic layer composition | Inner circumference 15 mm radius | | Intermediate circumference 23 mm radius | | Outer circumference 31 mm radius | |
|---|---|---|---|---|---|---|---|
| | | S/N (dB) | MWW (nm) | S/N (dB) | MWW (nm) | S/N (dB) | MWW (nm) |
| Example A | $CoTa_{10}Zr_2$ | 21.0 | 148 | 20.8 | 147 | 20.5 | 147 |
| C | | 20.9 | 146 | 20.7 | 146 | 20.7 | 145 |
| D | | 20.7 | 146 | 20.5 | 145 | 20.4 | 144 |
| Comp. Example B | $CoTa_3Zr_5$ | 15.9 | 149 | 15.2 | 160 | 20.3 | 148 |
| E | | 17.0 | 148 | 15.0 | 158 | 16.1 | 155 |
| F | | 16.8 | 146 | 16.1 | 150 | 14.9 | 157 |

EXAMPLE 3

A medium G with the same layer constitution and the film forming condition as those in Example 1, and medium H of a comparative example using a positive magnetic strain material were manufactured by using a glass substrate of 1.8 inch type with the same specification as in Example 1. For the media, evaluation for the magnetic property of the soft-magnetic underlayer by the optroscope and evaluation for the writing/reading characteristic of the medium were conducted in the same manner as in Example 2. The results are shown in Table 6 and Table 7. Measurement was conducted for 8 points at 9 mm, 15 mm, and 21 mm interval in the radial direction and each 45° interval in the circumferential direction.

In the medium G of the example, the easy magnetization axis was directed in the radial direction over the entire circumference and a stable S/N and a narrow MWW were obtained, whereas in the medium H of the comparative example, it was observed a trend that the easy magnetization axis tilted more in the circumferential direction from the intermediate circumference to the outer circumference and the dispersion was large and (Hex) was small compared with the medium B using the 2.5 inch substrate. In accordance with the trend, degradation of the S/N was observed not only in the inner circumference but also in the intermediate circumference and the outer circumference and widening of the MWW was observed from the intermediate circumference to the outer circumference.

In view of the above, it was found that the effect that the soft magnetic layer tends to direct more to the circumferential direction can be suppressed and a medium having a favorable property over the entire circumference can be obtained by using the small diameter substrate by the use of the negative magnetic strain material for the magnetic underlayer.

TABLE 6

| | | | Inner circumference (9 mm radius) | | | Intermediate circumference (15 mm radius) | | | Outer circumference (21 Mbps radius) | | |
|---|---|---|---|---|---|---|---|---|---|---|---|
| | Medium | Soft magnetic layer composition | Exchange magnetic field (Hex) (kA/m) | Direction of easy magnetization axis ($\theta$) (degree) | Standard deviation $\sigma$ (degree) | Exchange magnetic field (Hex) (kA/m) | Direction of easy magnetization axis ($\theta$) (degree) | Standard deviation $\sigma$ (degree) | Exchange magnetic field (Hex) (kA/m) | Direction of easy magnetization axis ($\theta$) (degree) | Standard deviation $\sigma$ (degree) |
| Exam. | G | $CoTa_{10}Zr_2$ | 2.50 | 3.0 | 1.3 | 2.58 | 1.8 | 1.2 | 2.60 | 1.6 | 0.7 |
| Comp. Exam. | H | $CoTa_3Zr_5$ | 2.49 | 86.4 | 2.7 | 2.00 | 81.0 | 8.5 | 1.25 | 40.0 | 12.5 |

TABLE 7

| | | | Inner circumference 9 mm radius | | Intermediate circumference 15 mm radius | | Outer circumference 21 mm radius | |
|---|---|---|---|---|---|---|---|---|
| | Medium | Soft magnetic layer composition | S/N (dB) | MWW (nm) | S/N (dB) | MWW (nm) | S/N (dB) | MWW (nm) |
| Example | G | $CoTa_{10}Zr_2$ | 21.2 | 148 | 21.0 | 148 | 20.8 | 147 |
| Comp. Example | H | $CoTa_3Zr_5$ | 16.3 | 149 | 15.6 | 156 | 16.3 | 160 |

EXAMPLE 4

Media I-T of identical substrate and the identical layer constitution with those of the medium A of Example 1 different soft-magnetic underlayers were manufactured. The compositions and the magnetic strain of the materials used for the soft magnetic layer are shown in Table 8.

TABLE 8

| | Medium | Soft magnetic layer composition | Magnetic strain ($10^{-7}$) | Easy magnetization axis within 5° from radial direction | Easy magnetization axis standard deviation less than 5° | S/N 20 dB or more | MWW 150 nm or less |
|---|---|---|---|---|---|---|---|
| Example | A | $CoTa_{10}Zr_2$ | −7 | ○ | ○ | ○ | ○ |
| Example | I | $CoTa_{8.5}Zr_3$ | −1 | ○ | ○ | ○ | ○ |
| Example | J | $CoTa_{15}Zr_2$ | −15 | ○ | ○ | ○ | ○ |
| Comp. Example | B | $CoTa_3Zr_5$ | 15 | × | × | × | × |
| Comp. Example | K | $CoTa_{10}Zr_5$ | 3 | × | × | × | × |
| Comp. Example | L | $CoTa_5Zr_3$ | 5 | × | × | × | × |
| Example | M | $Fe_{58}Co_{25}Ta_{15}Zr_2$ | −3 | ○ | ○ | ○ | ○ |
| Example | N | $Fe_{50}Co_{33}Ta_{15}Zr_2$ | −3 | ○ | ○ | ○ | ○ |
| Example | O | $Fe_{42}Co_{41}Ta_{15}Zr_5$ | −3 | ○ | ○ | ○ | ○ |

TABLE 8-continued

|  | Medium | Soft magnetic layer composition | Magnetic strain ($10^{-7}$) | Easy magnetization axis within 5° from radial direction | Easy magnetization axis standard deviation less than 5° | S/N 20 dB or more | MWW 150 nm or less |
|---|---|---|---|---|---|---|---|
| Comp. Example | P | $Fe_{51}Co_{34}Ta_{10}Zr_5$ | 15 | × | × | × | × |
| Example | Q | $CoW_7Zr_5$ | −2 | ○ | ○ | ○ | ○ |
| Comp. Example | R | $CoW_5Zr_{10}$ | 3 | × | × | × | × |
| Example | S | $CoNi_{13}Zr_{59}$ | −1.5 | ○ | ○ | ○ | ○ |
| Comp. Example | T | $CoNi_5Zr_{10}$ | 5 | × | × | × | × |

In view of the relation between the composition and the magnetic strain for A, B, I to L of the examples and comparative examples, it was found that the magnetic strain was negative in a case of adding Ta and Zr with Co being as a matrix, assuming the addition amount of Ta as X at % and the addition amount of Zr as (X/2−1) at % or less. On the other hand, for forming an amorphous film of excellent surface planarity, it is necessary to add Ta and Zr each at a predetermined amount or more and it is preferred that Z+3Y is 12 or more assuming the addition amount of Ta as X at % and the addition amount of Zr as Y at %. Considering them collectively, a soft magnetic film with negative strain and in an amorphous state can be formed by defining as: X>6 and 4−X/3<Y<X/2−1, assuming Ta addition amount as X at % and Zr addition amount as Y at %.

Then, as shown in the examples and the comparative examples M-P, in a case of adding Fe to the CoTaZr alloy, the magnetic strain shifts in the positive direction. Accordingly, it can be seen that more Ta has to be added. When comparing Example J and Examples M, N, and O, and Comparative Example K and Comparative Example P of adding Ta and Zr each in the identical amount, it can be seen that the magnetic strain changes positively by $+12 \times 10^{-7}$ by the addition of Fe. On the other hand, in a case of changing the Fe ratio from 50 to 70% at the compositional ratio for Fe and Co, it can be seen that the magnetic strain scarcely changes as shown in Examples M, N, and O. From the result, in a case of adding Ta and Zr with FeCo being as a matrix, it is preferred that X>10 and Y<X/2−1 in a case of defining the Ta addition amount to X at % or more and addition amount of Zr to Y at %.

Further, also for the soft magnetic material with addition of W and Ni, it was found that films of positive magnetic strain and negative magnetic strain can be formed depending on the composition. Also for the media, the direction and the distribution of the magnetic anisotropy of the soft-magnetic underlayer and the writing/reading characteristic were examined like in Example 1. For the result, Table 8 shows a case as "o" where the direction of the easy magnetization axis from the radial direction being within 5°, the dispersion at 8 points for the identical radius of less than 5° as the standard deviation, S/N of 20 dB or more, and MWW of 150 nm or less as the threshold values shown in Example 1 were attained for all of the measuring radii of 15 mm, 23 mm, and 31 mm, and as "x" where they are not attained even for one of radii. As a result, it was found that only the medium using the negative magnetic strain soft-magnetic underlayer reached the threshold values in all of the conditions. Further, the results show that not the material but the negative magnetic strain of the soft-magnetic underlayer contributes to the improvement of the property of the medium.

From the result described above, it was confirmed again that anisotropy of the soft-magnetic underlayer can be provided uniformly in the radial direction, and media of favorable S/N and small MWW for the entire radii can be prepared by using the negative strain material for the soft-magnetic underlayer.

COMPARATIVE EXAMPLE

A medium U having a pinned layer formed by stacking an Ni81Fe19 (at %) film to 5 nm and an $Ir_{20}Mn_{80}$ (at %) film to 10 nm between the adhesion layer and the soft-magnetic underlayer of the medium A of Example 1 was manufactured.

For the medium U, evaluation for the soft-magnetic underlayer by the optroscope and the evaluation for the S/N property and the MWW property using a spin stand were conducted. Table 11 shows the result of evaluation by the optroscope and Table 12 shows the result of evaluation by the spin stand. In a case of using the pinned layer, while a difference by so much as a bias from the pinned layer is caused to Hex'+ and Hex'−, an average for Hex'+ and Hex'− was defined as Hex' and average within identical radius of Hex' was defined as (Hex).

TABLE 9

|  | Medium | Inner circumference (15 mm radius) | | | Intermediate circumference (23 mm radius) | | | Outer circumference (31 mm radius) | | |
|---|---|---|---|---|---|---|---|---|---|---|
|  |  | Exchange magnetic field (Hex) (kA/m) | Direction of easy magnetization axis (θ) (degree) | Standard deviation σ (degree) | Exchange magnetic field (Hex) (kA/m) | Direction of easy magnetization axis (θ) (degree) | Standard deviation σ (degree) | Exchange magnetic field (Hex) (kA/m) | Direction of easy magnetization axis (θ) (degree) | Standard deviation σ (degree) |
| Comp. Example | U | 2.59 | 0.3 | 0.66 | 2.63 | 0.1 | 0.33 | 2.66 | 0.1 | 0.33 |

TABLE 10

| Medium | Inner circumference 15 mm radius | | Intermediate circumference 23 mm radius | | Outer circumference 31 mm radius | |
|---|---|---|---|---|---|---|
| | S/N (dB) | MWW (nm) | S/N (dB) | MWW (nm) | S/N (dB) | MWW (nm) |
| Comp. Example U | 18.0 | 148 | 17.9 | 147 | 18.0 | 147 |

In the medium U using the pinned layer, it can be seen that the direction of the easy magnetization axis scarcely tilts from the radial direction irrespective of the inner circumference, intermediate circumference, and the outer circumference, the standard deviation is also confined within 1° and the anisotropy of the soft-magnetic underlayer is more provided uniformly in the radial direction than that in the medium A of this example. However, the S/N property of the medium is degraded compared with a case of not using the pinned layer as shown in Table 12. It is considered that this is caused by the increase of the noises, etc. attributable to the leakage magnetic field from magnetization possessed in the pinned layer or the loss of balance between the upper and lower layers of the soft-magnetic underlayer.

In view of the above, it was found that the writing/reading characteristic of the medium was poor compared with the case of not using the pinned layer in a case of aligning the anisotropy of the soft-magnetic underlayer uniformly by using the pinned layer.

What is claimed is:

1. A perpendicular magnetic recording medium,
   wherein a perpendicular magnetic layer is formed by way of a soft-magnetic underlayer above a disk-shaped substrate having an opening at the center
   wherein the soft-magnetic underlayer comprises a first amorphous soft magnetic layer and a second amorphous soft magnetic layer separated from each other by a non-magnetic layer, the first soft magnetic layer and the second soft magnetic layer comprise a material having a negative magnetic strain constant and are antiferromagnetically exchange-coupled by way of the non-magnetic layer, and
   wherein an average value of an angle formed between the easy magnetization axis of the soft-magnetic underlayer and the radial direction of the substrate in the circumference at an identical radius is within 5 degrees;
   wherein the soft magnetic layer consists of FeCo at a combined 50 at % to 70 at % for the Fe and Co compositional ratio, and an additional amount of Ta and Zr;
   wherein Ta is X at % and the additional amount of Zr is Y at %, with X>10 and Y<X/2−1.

2. The perpendicular magnetic recording medium according to claim 1, wherein the standard deviation of the distribution in the circumference of an angle formed between the easy magnetization axis of the soft-magnetic underlayer and the radial direction of the substrate at an identical radius is less than 5 degrees.

* * * * *